Patented July 26, 1949

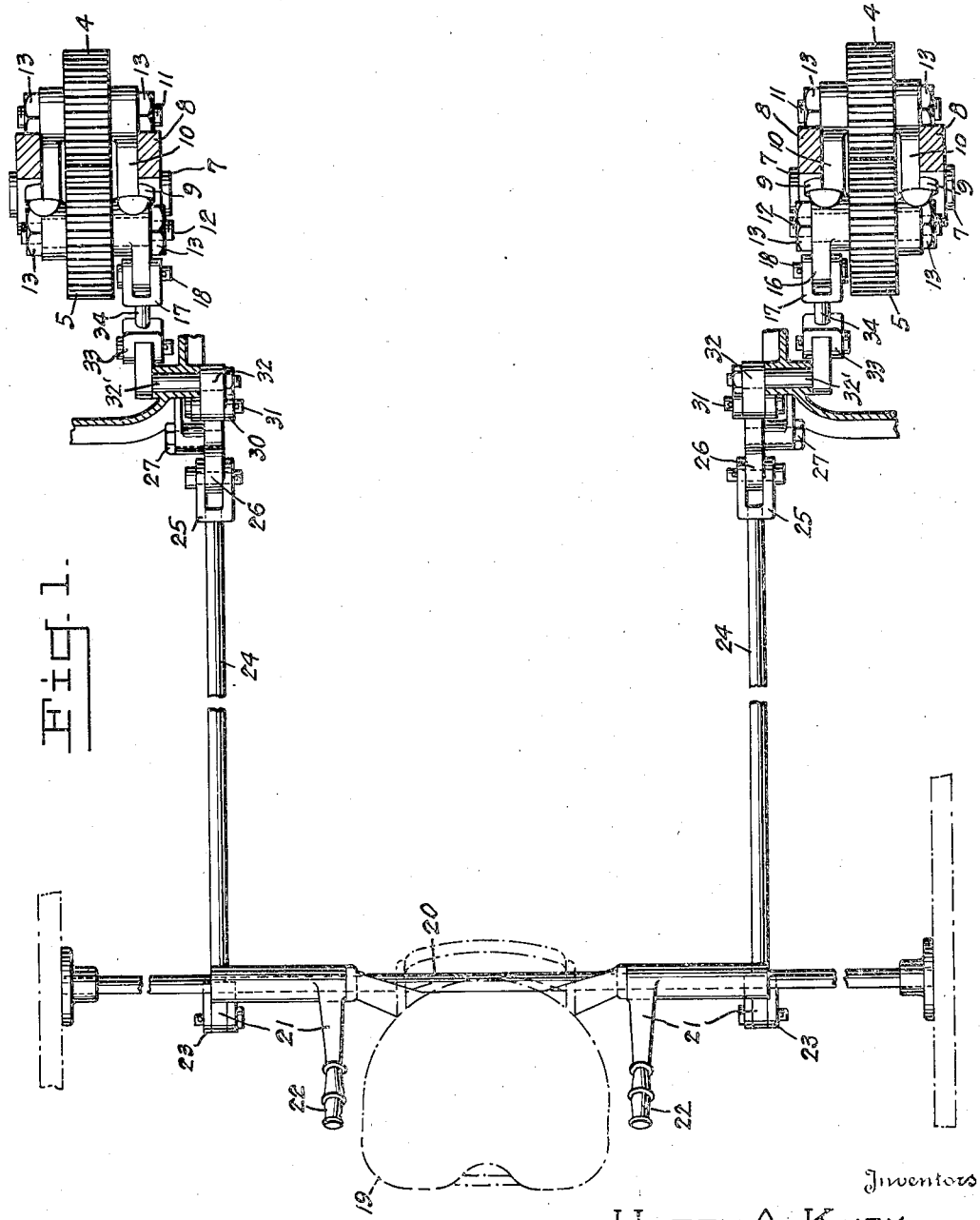

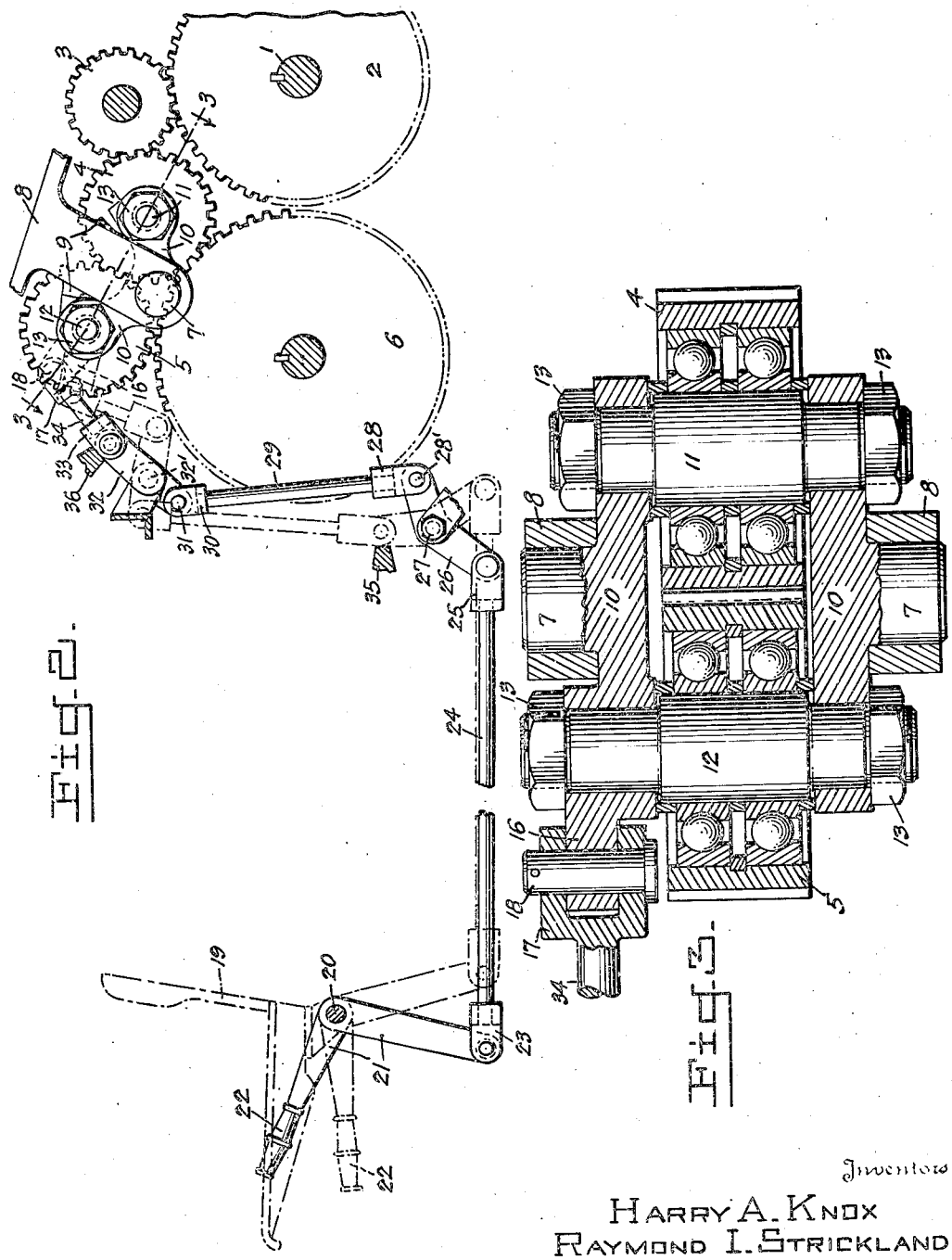

2,476,983

UNITED STATES PATENT OFFICE 2,476,983

TRANSMISSION FORWARD AND REVERSE GEAR WITH TOGGLE JOINT CONTROL

Harry A. Knox, Washington, D. C., and Raymond I. Strickland, Greenbelt, Md.

Application August 5, 1947, Serial No. 766,430

1 Claim. (Cl. 74—355)

(Granted under the act of March 3, 1883, as amended April 30, 1928; 370 O. G. 757)

The invention described in the following specification and claims may be manufactured and used by or for the Government for government purposes without the payment of any royalty thereon.

This invention relates to a power transmission for automotive vehicles, and, in particular, to a novel arrangement for effecting the shift from forward to reverse drive employing a toggle linkage.

Briefly, the system comprises a set of gears in the transmission train oscillatable about a fixed pivot for selective engagement, and a double toggle linkage for effecting such selective engagement.

It is therefore an object of the invention to provide a transmission which shall be smooth, secure and positive in action by the employment of rocking gears and toggle controls.

To this and other ends, reference is made, for a complete understanding of the invention, to the accompanying specification and to the drawings, in which like reference characters represent like parts throughout, and in which Figure 1 is a top plan view of the reversing gears and controls, Figure 2 is a side view of the same, including the transmission gearing, and Figure 3 is a detail taken along the line 3—3 of Figure 2.

The drawings are limited to the transmission system per se, only certain portions of the vehicle being shown to designate the anchor points and stops.

Referring to the drawings by character of reference there is shown an input shaft 1 carrying a pinion 2 which activates a driven spur 3, the power being carried over to pinion 6 from idler 3 either through gear 4 for one direction of motion of the output or through gears 4 and 5 for a reverse direction of the same. Gears 4 and 5 are selectively engageable with pinion 6 by rocking motion about shaft 7 carried by a portion 8 of the vehicle. The proper gear teeth clearance is maintained by means of stops 9.

Details of the rocking assemblage are shown in Figure 3. The rocking lever arms 10 are integral with shaft 7, and at their extremities are bored to receive the shaft 11 for the gear 4 and the shaft 12 for the gear 5, the rocking lever arms being fixed in place by nuts 13. Bearing races are provided for gears 4 and 5. The forward rocking lever arm has an extension 16 providing an anchorage for the controller linkage, the terminal clevis 17 being shown connected by means of a pin 18.

An operator's seat is shown in phantom at 19 and adjacent thereto a fixed pin 20 articulates a bell-crank lever 21 having a handle 22. A clevis 23 is articulated to the lower extremity of the lever 21 and connects to a second bell-crank 26 through a rod 24 and clevis 25. Bell-crank 26 is rotatable about a fixed pin 27 and carries a further clevis 28 articulated at 28′ and connects to a pin 31 on one end of a first-class lever 32 pivoted at 32′ through a rod 29 and clevis 30. The other end of the lever 32 pivotally carries a clevis 33 which is connected to clevis 17 through an extension 34 on the latter.

The transmission and controls are shown in full lines for position of one direction of rotation of the output shaft. Lowering the handle 22 to the position shown in phantom urges the rod 24 rearwardly, rotates bell-crank 26 and causes a toggle action by a force on the joint 28′ moving toward the line of centers of fixed pins 27 and 32′, and limited by a stop 35. The output of this force is manifest at the clevis 33 which urges the gear 5 downward into engagement with the pinion 6 and at the same time disengages gear 4 therefrom while maintaining gear 4 in continuous engagement with idler gear 3. The axis of gear 4 will preferably in each of its extreme positions lie slightly to alternate sides of the line joining the axis of shaft 7 and the axis of gear 3. Obviously the clevis 25 could be applied directly at joint 28′ instead of through the medium of a bell-crank.

In the reverse action, the toggle between 31 and 18 is the force-providing component, and urges gear 4 into mesh while toggle 27—31 is opening. Here the stop 36 limits the closing of the toggle.

It is thus seen that a reverse mechanism is provided that is smooth acting and certain, and the toggle arrangement gives a force which is small at the beginning of shift and increases to a high value at the final position where gear meshing has been made certain resulting in a proper "feel" in the controls. In addition, the toggle actions at 27—31 and 31—17 give, in each terminal position, a desirable locking action without auxiliary elements.

The view in Figure 1 shows a dual set of reversing gears and controls in mirror image illustrating the use in a vehicle such as a tank where steering-by-driving is desirable.

Having thus described our invention what we desire to claim as new and secure by Letters Patent is:

A reverse-gearing transmission system comprising an input gear and an output gear, an idler gear continuously meshed with said input gear, and a reversing assembly comprising a set of gears rockably mounted for selective engagement with said output gear, one of said set of gears being continuously engaged with said idler gear, and means to rock said set of gears, said last means comprising a toggle linkage including two successive toggle units each operating at all times with said rocking means but out of phase, one with the other in correspondence with the position of said set of gears, said toggle linkage comprising a first pivot, a second fixed pivot, a first-class lever mounted on said second pivot as a fulcrum, a second lever articulated on said first pivot, a rod joining the end of said second lever with one end of said first lever and a rod joining the other end of said first lever with one of said set of gears, said levers and rods constituting a set of toggles alignable as units alternately.

HARRY A. KNOX.
RAYMOND I. STRICKLAND.

REFERENCES CITED

The following references are of record in the file of this patent:

UNITED STATES PATENTS

| Number | Name | Date |
|---|---|---|
| 655,749 | Allyne | Aug. 14, 1900 |
| 1,158,087 | Viste | Oct. 26, 1915 |
| 1,736,064 | Walker | Nov. 19, 1929 |
| 1,827,817 | Ingersoll | Oct. 20, 1931 |
| 2,147,694 | Fawick | Feb. 21, 1939 |
| 2,338,379 | Henke | Jan. 4, 1944 |
| 2,372,852 | Randall | Apr. 3, 1945 |
| 2,394,571 | Swiatecki | Feb. 12, 1946 |